United States Patent

[11] 3,582,178

| [72] | Inventors | Olin W. Boughton<br>Williamsville;<br>Milton H. Sussman, Buffalo, both of, N.Y. |
|---|---|---|
| [21] | Appl. No. | 831,547 |
| [22] | Filed | June 9, 1969 |
| [45] | Patented | June 1, 1971 |
| [73] | Assignee | American Optical Corporation<br>Southbridge, Mass. |

[54] DUAL VIEWING TEACHING MICROSCOPE WITH UNIVERSAL RETICLE PROJECTION UNIT
1 Claim, 5 Drawing Figs.

[52] U.S. Cl.................................................. 350/10,
350/33, 356/252
[51] Int. Cl...................................................... G02b 27/36,
G02b 21/18
[50] Field of Search............................................ 350/10,
31—36; 356/251, 252; 353/11, 42

[56] References Cited
UNITED STATES PATENTS

| 2,848,922 | 8/1958 | Field | 353/42 |
| 2,957,389 | 10/1960 | Moore | 352/42 |
| 3,010,019 | 11/1961 | Sohst | 356/251X |
| 3,186,300 | 6/1965 | Littmann | 350/36X |

FOREIGN PATENTS

| 1,257,537 | 2/1961 | France | 350/10 |

*Primary Examiner*—David H. Rubin
*Attorneys*—William C. Nealon, Noble S. Williams and Robert J. Bird

ABSTRACT: A teaching microscope having a pair of eyepieces and having a reticle pointer member, the image of which is projected into the objective light path and is movable so as to enable an operator to point out desired characteristics in the microscope image.

INVENTOR.
OLIN W. BOUGHTON
MILTON H. SUSSMAN
BY Robert J. Bird
ATTORNEY

# 3,582,178

DUAL VIEWING TEACHING MICROSCOPE WITH UNIVERSAL RETICLE PROJECTION UNIT

BACKGROUND OF THE INVENTION

It is known in the prior art to use a dual-viewing microscope for purposes of instruction. Typically in such a microscope, an instructor viewing an object through one eyepiece will point out to an observer, viewing through a second eyepiece, an object by means of a pointer moved relative to the object itself. The limitations of this method are apparent. The pointer is physically large relative to a microscopic object, and it is possible for a pointer to disfigure or damage the object.

It is an object of the present invention to provide a dual-viewing microscope with an integral pointer by which to view desired area of the microscope image.

Other objects, advantages and features of the present invention will become apparent from the following description of one embodiment thereof, when taken in connection with the accompanying drawing.

SUMMARY OF THE INVENTION

The present invention is practiced in one form by a microscope having a pair of eyepieces for dual viewing. A reticle defines a pointer which is imaged into the optical axis of the microscope. The reticle is universally mounted and therefore movable to point out any area in the microscope image.

DRAWINGS

DESCRIPTION

Figure 1:
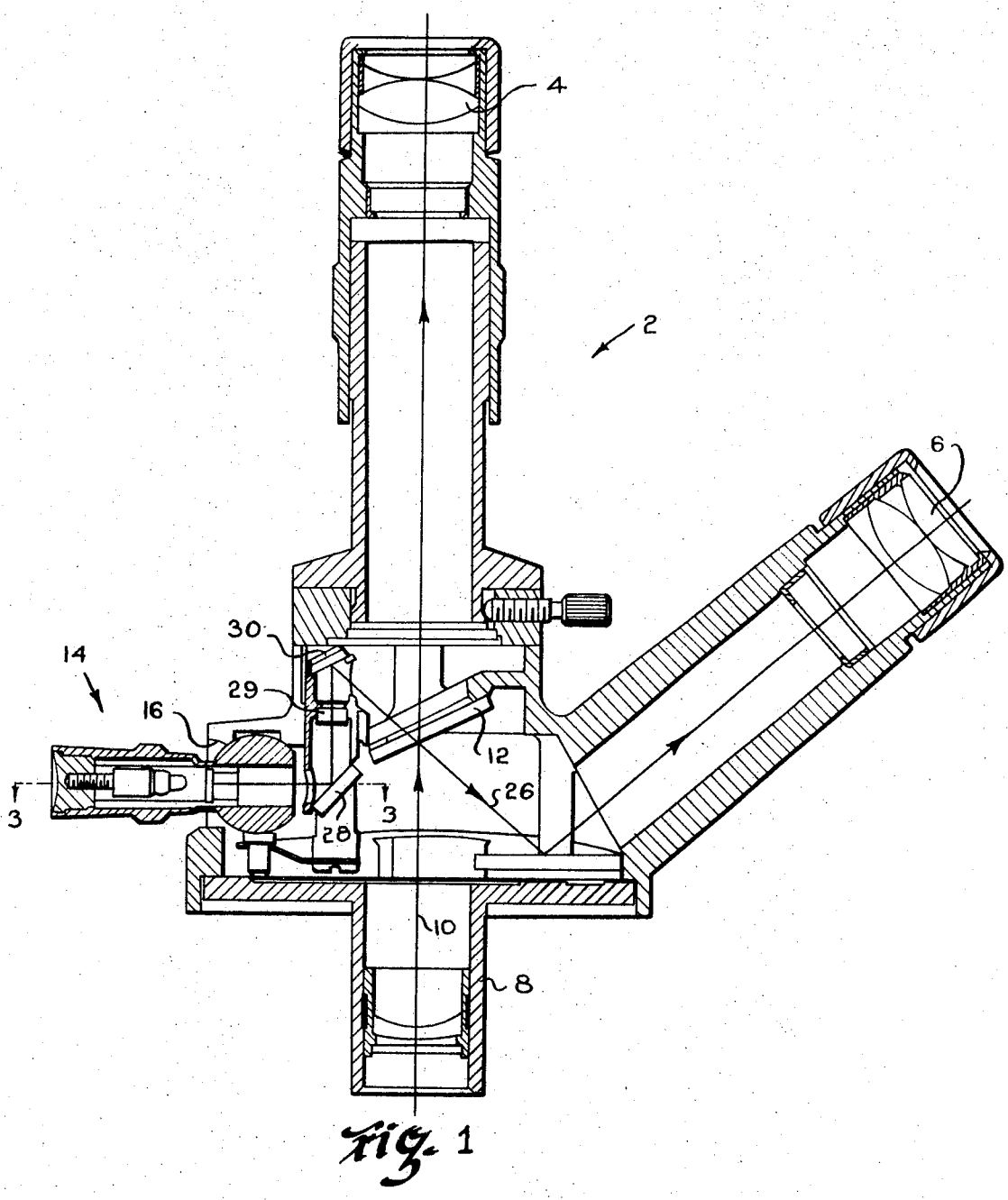
FIG. 1 is a side elevation view, partly in section, of a dual-viewing microscope incorporating the present invention.

Referring now to FIG. 1, there is shown the portion of a dual-viewing microscope with which the present invention is concerned. The microscope 2 includes a pair of similar eyepieces 4 and 6, one being for an instructor and one being for an observer. Microscope 2 is disposed relative to its objective, not shown, at the lower extremity of body tube 8. The path of light is from the object, through the objective, and into the body tube as shown by light ray or optical path 10.

There is disposed in optical path 10 a partially silvered mirror or beam splitter 12. Mirror 12 acts as a partial transmitter and a partial reflector. From the surface of mirror 12 thus, the optical path 10 is split such that one part is directed at eyepiece 4 and another part is directed at eyepiece 6. Further detail of the optical path need not be described herein since it is not essential to an understanding of the present invention.

Body tube 8 is provided with a pointer handle, generally indicated at 14. Handle 14 is mounted relative to body 8 by means of an opening 16 which provides optical access to the optical path 10 at mirror 12.

Figure 2:
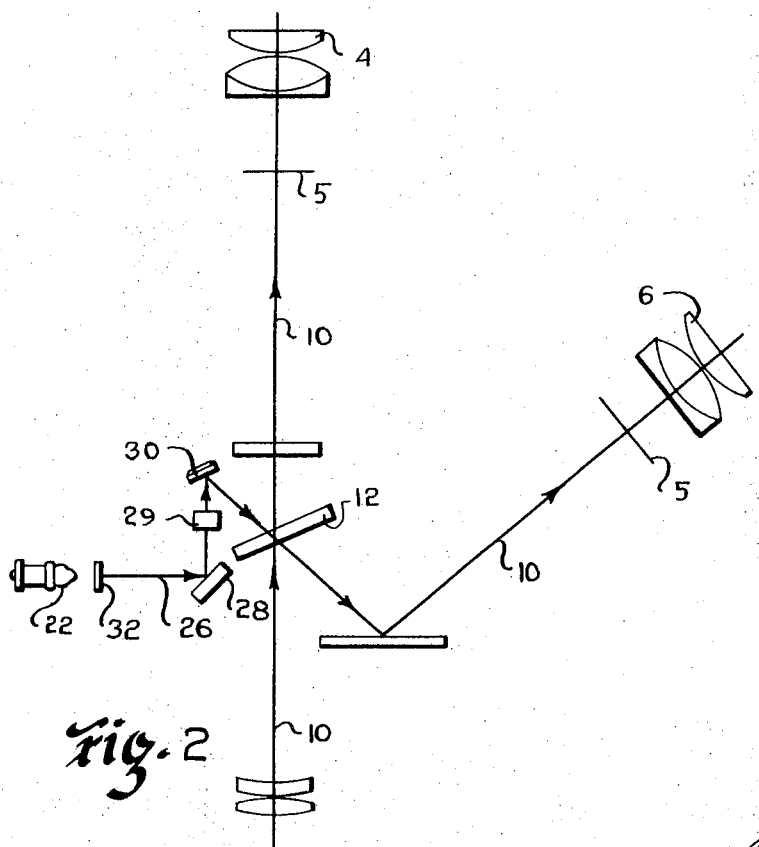
FIG. 2 is an optical layout of the microscope shown in FIG. 1.
Figure 3:
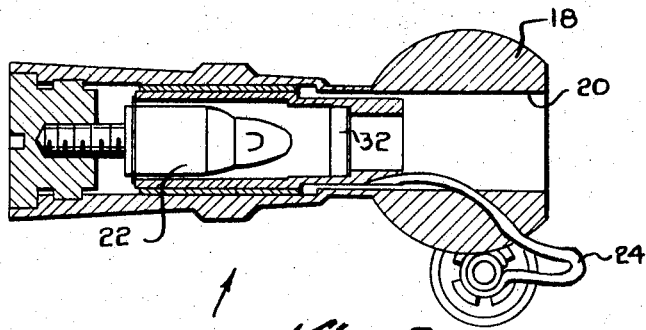
FIG. 3 is an enlarged detail of FIG. 1.

Pointer handle 14 is more clearly shown in FIG. 3. It is universally movable relative to opening 16 by means of a ball joint member 18 through which is formed a light path aperture or passage 20. Handle 14 is hollow and accommodates an electric lamp 22 therein. Lamp 22 is electrically connected by suitable connections 24 to the microscope illuminating system referring now to FIG. 2. Light from lamp 22, follows a light path which will be designated 26 and which includes mirrors 28 and 30 and a projection lens 29. Light from lamp 22 is directed along path 26 through passage 20 and, by means of mirrors 28 and 30, onto beam splitter 12. The angle of incidence of light path 26 on the mirror 12 is such that the light passing through the mirror 12 is codirectional with that part of optical path 10 directed to eyepiece 6. That portion of light beam 26 reflecting from mirror 12 is codirectional with that part of optical path 10 directed to eyepiece 4. Eyepieces 4 and 6 are disposed relative to focal planes shown at 5.

Figure 4:
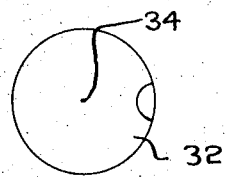
FIG. 4 is an enlarged plan view of the reticle member employed in the present invention.

Referring now to FIG. 4, there is shown a flat reticle plate 32, defining a reticle aperture 34. This reticle aperture 34 is more clearly shown by the enlarged view of FIG. 5. Plate 32 is disposed within pointer handle 14 at a point in light path 26 so that the lamp filament is imaged thereupon.

Figure 5:
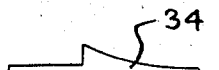
FIG. 5 is a greatly enlarged outline of the aperture defined by the reticle shown in FIG. 4.

It will be apparent, that when lamp 22 illuminates aperture 34, projection lens 29 projects an image of reticle aperture 34 along light path 26 and onto beam splitter 12 where it is superimposed on optical path 10 in an area where light rays 10 are converging. Beam splitter 12 causes this image of aperture 34 to become a part of the light path directed to both focal planes 5 and toward each of the eyepieces 4 and 6. Aperture 34 is arrow shaped, as shown in FIG. 5, for the purpose of pointing out, in the image fields, desired characteristics of the object under examination. Since handle 14 is mounted for universal movement relative to opening 16, reticle aperture 34 can be pointed in any direction and put in any position in the image field. The size of the arrow shaft length and width, as well as the tip, is precisely made so that these parts are useful in measuring sizes in the object itself.

It will be apparent that a dual-viewing teaching microscope has herein been provided which enables an instructor and an observer simultaneously to examine a specimen and the instructor to point out to the observer any desired spot in the image field.

It may occur to others of ordinary skill in the art to make modifications of the present invention which will remain within the concept and scope thereof and not constitute a departure therefrom. Accordingly, it is intended that the invention be not limited by the details in which it has been described, but that it encompass all within the purview of the following claims.

We claim:

1. A dual-viewing teaching microscope comprising a body tube having an objective at its lower end and a housing at its upper end, a first eyepiece mounted at the upper end of the housing in alignment with said body tube and a second eyepiece mounted on a side portion of the housing in upwardly angled relationship to said body tube, a partially silvered mirror mounted in said housing in angled relationship to said body tube and said first eyepiece, whereby a portion of the converging imaging beam from said objective is transmitted through said partially silvered mirror to the image plane of said first eyepiece and the remaining portion is reflected from the lower surface of the partially silvered mirror to the image plane of said second eyepiece, a reticle pointer handle projecting from the side of said housing opposite said second eyepiece, said pointer handle comprising a hollow tubular member having a ball-shaped enlargement at its inner end seated in socket means within said housing for universal movement, a lamp mounted at the outer end of said tubular member, a reticle plate mounted in the tubular member between said lamp and said ball-shaped enlargement and in outwardly spaced relationship to the center of said ball shaped enlargement, said reticle plate having a small light transmitting central aperture in the form of a directional pointer, and a pair of mirrors and a projection lens mounted in the housing between the inner end of said hollow tubular member and said partially silvered mirror to form a converging reticle imaging beam directed at the upper surface of said partially silvered mirror for partial reflection and transmission, respectively, to the image planes of said first and second eyepieces, whereby manual shifting and rotation of the projecting portion of said reticle pointer handle enables the directional pointer reticle image to be viewed at any desired point and orientation in the image field of both eyepieces.